(Model.)

A. BRADFORD.
WINDMILL.

No. 509,866. Patented Dec. 5, 1893.

Witnesses:
John Grist
H. H. Horsey.

Inventor:
Albert Bradford
By Henry Grist
Attorney.

UNITED STATES PATENT OFFICE.

ALBERT BRADFORD, OF MORDEN, CANADA.

WINDMILL.

SPECIFICATION forming part of Letters Patent No. 509,866, dated December 5, 1893.

Application filed August 21, 1893. Serial No. 483,635. (Model.) Patented in Canada June 28, 1893, No. 43,405.

*To all whom it may concern:*

Be it known that I, ALBERT BRADFORD, of Morden, in the Province of Manitoba, in the Dominion of Canada, have invented certain new and useful Improvements in Windmills, (for which I have obtained a patent in Canada, No. 43,405, bearing date June 28, 1893;) and I do hereby declare that the following is a full, clear, and exact description of the same, reference being had to the accompanying drawings, in which—

Figure 1:
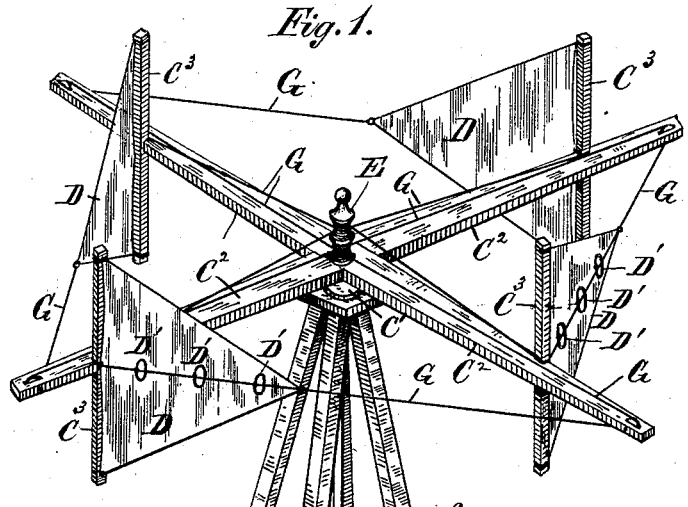
Figure 2:
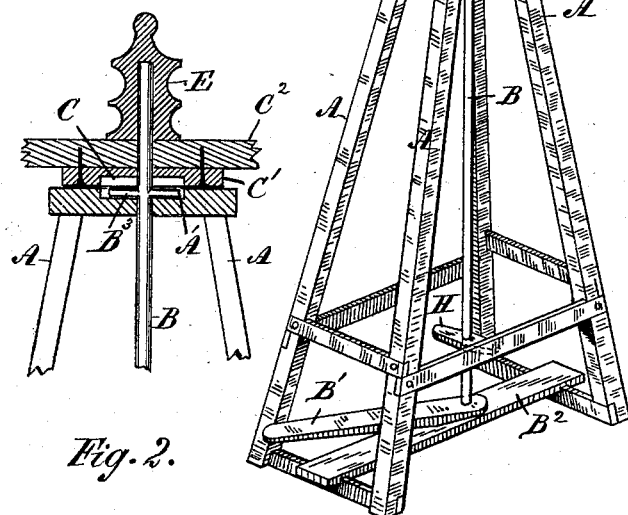
Figure 3:
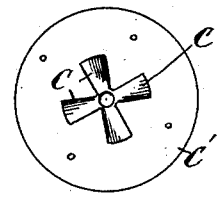
Figure 4:
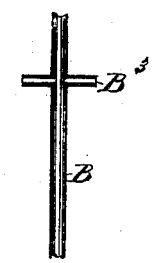

Figure 1, is a perspective view of my improved wind mill. Fig. 2, is a vertical section enlarged, at the intersection of the wheel, derrick and shaft, to show ratchet plate and stop pin for engaging and releasing the shaft and wheel. Fig. 3, is a diagram of the ratchet plate detached, and Fig. 4, is a view of the shaft, showing the stop pin to engage the ratchet plate to connect the shaft and wheel.

My invention has for its object to provide a horizontal rotating wind wheel having radial arms, with sails of textile material and an arrangement of ropes winding on and unwinding from a spool or reel fixed to the top of the driving or power shaft, whereby the sails will be automatically furled by slightly dropping the shaft to disconnect it from the wheel, the ropes then winding on and unwinding from the spool by the rotation of the wheel. The sails are unfurled or set by rotating the shaft by hand by a cross bar or other device whereby the ropes or cords will be unwound and wound from the spool to draw out the sails, and afterward the shaft is lifted into gear with the wheel whereby the shaft will rotate by wind power.

My invention consists in the construction and combination of parts, as will be hereinafter set forth and claimed.

A, is the derrick of any suitable construction having a flat top provided with a cavity A'.

B, is the driving or power shaft, stepped into a lever B', which is fulcrumed to the floor B², whereby the depression of the outer end of the lever lifts the shaft endwise, to raise out of said cavity a stop pin B³, which passes crosswise through said shaft to engage said pin with the ratchets or radial notches C, in a plate C', secured to the wheel arms C², at their intersection to cause the wheel to rotate the shaft when wind power is required.

The wheel arms or spokes C², near the outer ends, are provided with a vertical cross yard C³, to which is secured the sail D, of canvas or other textile material, and said sails are preferably provided with a row of guide rings D', horizontally.

The driving or power shaft B, passes through the cavity in the top of the derrick and through the center of the ratchet plate C', and center of the wheel, and projects upwardly from the wheel, and on said extended end of the shaft is fixed a spool or reel E, which has preferably two peripheral grooves.

G, are ropes secured about the middle to the free ends or points of the triangular sails D, and run through the guide rings D', and around one of the grooves of the spool, and the other extremity of the rope passes through a pulley near the ends of the arms C², and thence to the spool where it winds on the other groove in a contrary direction or reversely to the other end winding on the spool, so that when the shaft is dropped or lowered whereby the stop pin B³, will be out of engagement with the ratchet plate secured to the wheel, the shaft and spool will remain stationary, while the wheel will continue to rotate, thereby winding the slack to furl the sails, after which the wheel ceases to rotate. Unfurling the sails is effected by causing the spool to rotate to unwind and wind the slack in the direction contrary to winding and unwinding the cords or ropes on the spool when furling, and such rotation of the spool is effected when the shaft and wheel are out of gear by rotating the shaft B, by hand movement of a cross bar H, or other device, to cause the sails to be slightly drawn out to catch the wind. The wind will then complete the unfurling, and the sails when set or unfurled will drive the shaft by wind power when the wheel and shaft are in gear or engagement. The sails fill before the wind and come up against the wind close-hauled or flapping.

I claim as my invention—

The combination with a derrick having a cavity A', at top, of the driving shaft B, having a cross pin $B^3$, or pawl removable from said cavity by slightly lifting the shaft, the wheel arms $C^2$, having, a plate $C'$, provided with radial notches or ratchets C, and adapted to engage said cross pin or pawl when said shaft is lifted, said wheel arms having vertical yards $C^3$, carrying sails D, a spool E, fixed to the top of said shaft, and ropes G, secured at the middle to the clews of the sails, the ends of said ropes or clewlines winding around said spool in reverse directions, whereby the wheel rotates independently of the shaft and spool to furl the sails, and the shaft and spool are rotated by hand independently of the wheel to unfurl the sails, as set forth.

ALBERT BRADFORD.

Witnesses:
J. B. McLAREN,
W. H. MACKENZIE.